(12) United States Patent
Faulkner et al.

(10) Patent No.: US 6,764,637 B2
(45) Date of Patent: Jul. 20, 2004

(54) METHODS OF JOINING POLYMERS USING ULTRASONIC ENERGY

(75) Inventors: Lynn L. Faulkner, Westerville, OH (US); Richard P. Heggs, Dublin, OH (US); Douglas B. Pape, Upper Arlington, OH (US); Michael D. Schulte, Columbus, OH (US); Micah M. Kattner, Grove City, OH (US)

(73) Assignee: Battelle Memorial Institute, Columbus, OH (US)

(*) Notice: Subject to any disclaimer, the term of this patent is extended or adjusted under 35 U.S.C. 154(b) by 404 days.

(21) Appl. No.: 09/989,312

(22) Filed: Nov. 20, 2001

(65) Prior Publication Data

US 2003/0094735 A1 May 22, 2003

(51) Int. Cl.[7] .............................................. B32B 31/00
(52) U.S. Cl. ........................ 264/444; 264/69; 264/510
(58) Field of Search ................................. 264/442, 443, 264/444, 69, 510, 279, 45.5, 46.4; 156/73.1

(56) References Cited

U.S. PATENT DOCUMENTS

| | | | |
|---|---|---|---|
| 3,298,065 A | 1/1967 | Pendleton | 18/14 |
| 4,259,272 A | 3/1981 | MacFee | 264/23 |
| 4,288,398 A | 9/1981 | Lemelson | 264/23 |
| 4,925,161 A | 5/1990 | Allan et al. | 264/69 |
| 5,017,311 A | 5/1991 | Furusawa et al. | 264/23 |
| 5,306,129 A | 4/1994 | Ibar | 425/3 |
| 5,360,329 A | 11/1994 | Lemelson | 425/143 |
| 5,494,426 A | 2/1996 | Ibar | 425/3 |
| 5,650,104 A | 7/1997 | Ibar | 264/40.5 |
| 5,705,201 A | 1/1998 | Ibar | 425/130 |
| 5,746,981 A | 5/1998 | Satoh | 422/128 |
| 5,785,910 A | 7/1998 | Sakashita et al. | 264/45.5 |
| 5,885,495 A | 3/1999 | Ibar | 264/69 |
| 6,132,669 A * | 10/2000 | Valyi et al. | 264/510 |
| 6,210,030 B1 * | 4/2001 | Ibar | 366/78 |
| 6,629,831 B2 * | 10/2003 | Wei et al. | 425/174 |

FOREIGN PATENT DOCUMENTS

GB 2306378 A 5/1997 ........... B29C/45/00

* cited by examiner

Primary Examiner—James Sells
(74) Attorney, Agent, or Firm—MacMillan, Sobanski & Todd, LLC

(57) ABSTRACT

In a method of joining a solidifiable liquid polymeric material to a solid material to produce a solid article, the solid material is contacted with the liquid polymeric material at an interface. Ultrasonic energy is applied so that the energy reaches the interface between the contacting solid material and liquid polymeric material. A joint is formed at the interface by allowing or causing the liquid polymeric material to solidify, to produce a solid article comprising the solidified polymeric material joined to the solid material.

30 Claims, 4 Drawing Sheets

METHODS OF JOINING POLYMERS USING ULTRASONIC ENERGY

TECHNICAL FIELD

This invention relates in general to methods of joining materials such as polymers, and in particular to methods of joining polymers using ultrasonic energy.

BACKGROUND OF THE INVENTION

Ultrasonic (high frequency vibratory) energy has been used in polymer forming processes in several different ways. One class of applications involves the use of fixed-frequency ultrasonic energy for enhanced mixing or densification. For example, a means to affect the size of crystalline phases in thermoplastic polymers using ultrasonic energy is described in U.S. Pat. Nos. 3,298,065 and 4,288,398. Ultrasonic energy has also been used in a process for making directionally-oriented thermoplastic polymer articles via melt-oscillation.

Another class of applications entails the use of variable-amplitude ultrasonic energy to affect polymer melt rheology. This is described, for example, in U.S. Pat. No. 5,885,495, in which ultrasonic energy is used to affect polymer melt viscosity prior to molding.

Ultrasonic energy has also been used to join two solid polymer parts by generating heat through friction at a desired interface, a process commonly known as ultrasonic welding. U.S. Pat. No. 5,830,300 is but one of many examples of ultrasonic welding. In a typical process, ultrasonic energy is transferred from an energy source to a metallic horn that focuses the energy in a desired manner. The horn is placed in contact with the polymer parts, and mechanical vibrations are transferred from the horn to the parts. The vibrations generate heat through friction at the interface between the solid parts, which is sufficient to melt the parts at the interface. When the parts cool and solidify, a bond is formed at the interface between the parts.

As described in U.K. Patent Application GB 2,306,378-A, ultrasonic energy has also been used in process of injection molding a polymer to make hubcaps. In the process, a molten polymer is injected from a nozzle and is separated into two flow fronts as it flows around an insert in the mold. The flow fronts converge on the other side of the insert. Ultrasonic vibrations are applied to the molten polymer to mitigate against the formation of weld lines in the molded hubcap at the location of the converging flow fronts.

There is no suggestion in the prior art of using ultrasonic energy to improve the bonding of a molten polymer to a previously formed solid polymer part. Also, there is no suggestion of using ultrasonic energy to improve the bonding of different types of molten polymers to each other, such as during a molding or extrusion process.

SUMMARY OF THE INVENTION

The present invention relates to a method of joining a solidifiable liquid polymeric material to a solid material to produce a solid article. In the method, the solid material is contacted with the liquid polymeric material at an interface. Ultrasonic energy is applied so that the energy reaches the interface between the contacting solid material and liquid polymeric material. A joint is formed at the interface by allowing or causing the liquid polymeric material to solidify, to produce a solid article comprising the solidified polymeric material joined to the solid material.

In another embodiment, the invention relates to a method of joining a first solidifiable liquid polymeric material to a second solidifiable liquid polymeric material to produce a solid article, where the first and second liquid polymeric materials are materials of differing composition. The method involves contacting the first liquid polymeric material with the second liquid polymeric material at an interface. Ultrasonic energy is applied so that the energy reaches the interface between the contacting first polymeric material and second polymeric material. A joint is formed at the interface by allowing or causing the first polymeric material and the second polymeric material to solidify, to produce a solid article comprising the solidified first polymeric material joined to the solidified second polymeric material.

In another embodiment, the invention relates to a method of joining a first material to a second material in a molding process to produce a solid article. The first material and the second material are materials of differing composition, and at least one of the first and second materials is a solidifiable liquid material. The method involves introducing the first material and the second material into a mold, thereby contacting the first material with the second material at an interface. Ultrasonic energy is applied so that the energy reaches the interface between the contacting first material and second material. A joint is formed at the interface by allowing or causing the liquid material to solidify, to produce a solid article comprising the solid first material joined to the solid second material.

In another embodiment, the invention relates to a method of joining a first solidifiable liquid material to a second solidifiable liquid material in an extrusion process to produce a solid article, where the first and second materials are materials of differing composition. The method involves extruding the first material and the second material, thereby contacting the first material with the second material at an interface. Ultrasonic energy is applied so that the energy reaches the interface between the contacting first material and second material. A joint is formed at the interface by allowing or causing the first material and the second material to solidify, to produce a solid article comprising the solid first material joined to the solid second material.

In another embodiment, the invention relates to a method of joining a solidifiable liquid polymeric material to a reinforcement material or a filler. The method involves contacting the reinforcement material or the filler with the liquid polymeric material at an interface. Ultrasonic energy is applied so that the energy reaches the interface. A joint is formed at the interface by allowing or causing the polymer to solidify, to produce a material comprising the solidified polymeric material joined to the reinforcement material or the filler.

In a further embodiment, the invention relates to a method of joining a first material to a second material to produce a solid article, where at least one of the first and second materials is a solidifiable liquid material. A solid or liquid compatibilizing material is provided along with the first and second materials. The first material and the second material are contacted with the compatibilizing material, to form at least one interface between at least two of the compatibilizing material, the first material and the second material. Ultrasonic energy is applied so that the energy reaches the at least one interface. At least one joints is formed at the at least one interface by allowing or causing the first material and/or the second material to solidify in contact with the solid compatibilizing material, or by allowing or causing the first and/or second materials and the liquid compatibilizing material to solidify. A solid article is produced comprising the first material, the second material and the compatibilizing material joined together. The application of the ultrasonic energy improves the integrity of the joint(s) compared to the same method without the application of ultrasonic energy.

Various objects and advantages of this invention will become apparent to those skilled in the art from the following detailed description of the preferred embodiments, when read in light of the accompanying drawings.

DETAILED DESCRIPTION AND PREFERRED EMBODIMENTS OF THE INVENTION

Figure 1:
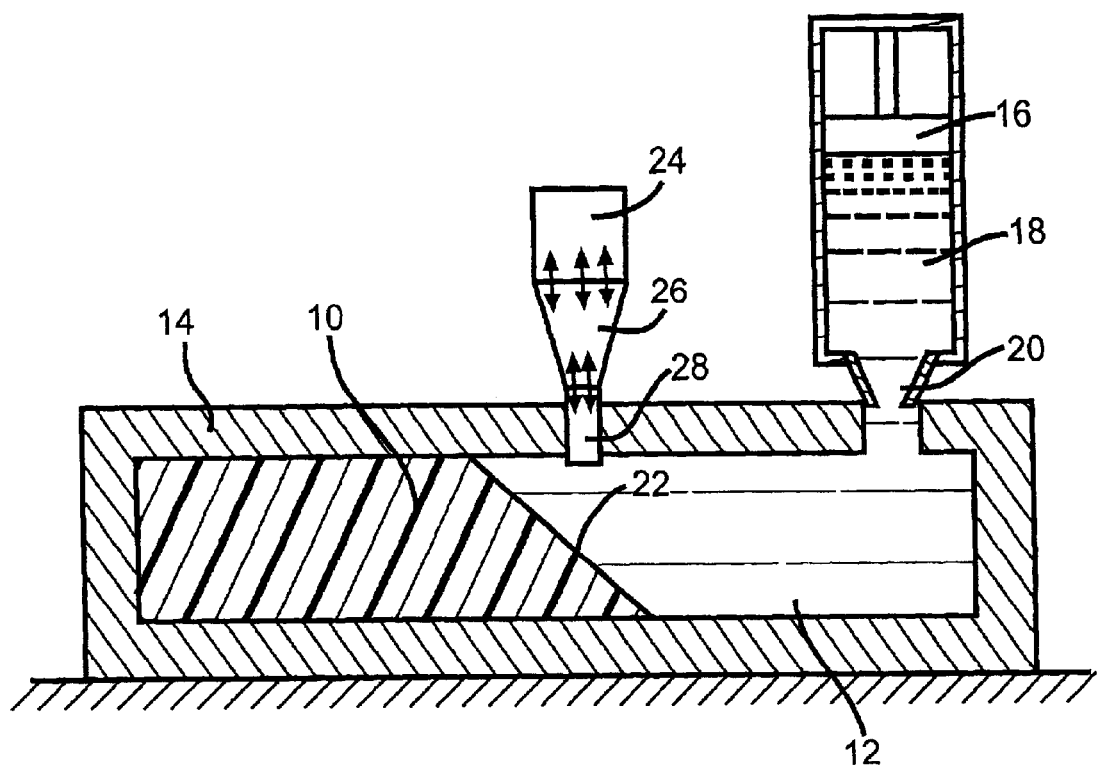
FIG. 1 is a schematic representation of an ultrasonic injection molding method in accordance with this invention.

In a preferred embodiment, the present invention relates to a method of joining a solidifiable liquid polymeric material to a solid material to produce a solid article. The term "polymeric material" includes polymers, prepolymers, partially polymerized materials, and/or monomers. A blend of two or more of such materials can also be used. Other materials such as fillers, thermal initiating agents, curing agents, carboxylic acids, surfactants, pigments, dyes, UV protection agents, stabilizing agents and others can also be included in the polymeric material. The liquid polymeric material is usually a castable material. Typically, the liquid polymeric material is a molten thermoplastic polymer, but it can also be a thermoset polymer prior to curing. The liquid polymeric material can also be a mixture of liquid polymers that react together to harden. The solid material can be a solid part, component or any other type of solid material. For example, the solid material can be a metal part, a rubber part, a ceramic part, a solid material that is porous such as concrete, a solid polymeric material, or others. The surface of the solid material can be prepared or treated to enhance the joining of the liquid polymeric material to the solid material. The solid material can be the same type of material as the liquid polymeric material, or it can be a different material. More than one liquid polymeric material and/or solid material can also be joined by the method of the invention.

The solid material is contacted with the liquid polymeric material at an interface between the solid material and the liquid polymeric material. The interface can be of any general shape. For example, it can be flat, curved, warped, random, or any other type of interface.

Any method suitable for producing the desired article can be used for contacting the solid material with the liquid polymeric material. Either the liquid polymeric material, the solid material, or both the liquid and solid can be stationary or moving. In a preferred method, the solid material is a previously formed part which is positioned inside a mold. The liquid polymeric material is introduced into the mold so that it contacts the solid material. Preferably, the method is an injection molding process in which the liquid polymeric material is injected into the mold, and a flow front of the liquid polymeric material flows against the solid material. Other types of molding can also be used, such as blow molding.

In other methods, the contacting step involves forming a layer of the liquid polymeric material over a previously formed solid material. One or more additional layers of polymeric material can be formed and joined to each preceding layer by the method of the invention. The method of the invention enables the fabrication of multilayer structures with greatly improved delamination resistance.

Further embodiments will apply to potting, laminating, coating, painting, filling, spraying, or applying processes in which a solidifiable liquid polymeric material is to be joined to an existing solid part, component or other material.

The conventional wisdom in the art of polymer molding has long been that molded articles having joints formed between inserted parts and a molten polymer are inferior in quality to molded one-piece articles. This inferiority is manifested in poor stress and strain values and adhesive failure modes. To overcome this and other difficulties in polymer article manufacturing, we have discovered that applying ultrasonic energy to such joints as they are being formed greatly enhances their integrity. The ultrasonic energy is applied so that the energy reaches the interface between the contacting solid material and liquid polymeric material. Any timing for applying the ultrasonic energy suitable for improving the integrity of the joint can be used. Generally, it is best to have the ultrasonic energy reach the interface when the liquid polymeric material and the solid material first meet, leave the ultrasonic energy on long enough to achieve good interfacial properties, and then turn off the ultrasonic energy to allow the materials to cool, solidify and form a good bond. However, the invention is not limited to any particular timing. For example, the ultrasonic energy could be turned on before the materials contact and left on just long enough for sufficient energy to improve the joint to reach the interface between the contacting materials.

The improved joint integrity provided by the application of the ultrasonic energy may include, for example, improved yield strength, improved impact strength, improved fatigue resistance, improved porosity such as freedom from voids, improved density, improved fracture toughness, improved surface roughness, or any other desirable property.

As discussed above, ultrasonic welding for joining two solid polymer parts has long been known. The ultrasonic joining method of the present invention differs significantly from ultrasonic welding processes. Whereas ultrasonic welding involves the joining of two initially solid parts, this invention uses ultrasonic energy to aid the joining of a liquid polymeric material with a solid material, producing a bond superior to that produced without the aid of ultrasonic energy.

The ultrasonic energy can be applied so that the energy reaches the interface by any suitable method. The ultrasonic energy is transmitted to portions of both the liquid polymeric material and the solid material at the interface. In a typical method, ultrasonic energy is transferred from an energy source to an ultrasonic horn or other applicator that focuses the energy in a desired manner. The horn is typically fabricated from a metallic material such as aluminum, titanium or steel which is designed to be resonant at the operating frequency. Upon contact with the material(s) to be acted upon, mechanical vibrations are transferred from the tip of the horn.

The ultrasonic energy can be applied directly to the region of the interface, or it can be applied to the entire area containing the liquid polymeric material and the solid material including the region of the interface. The positioning of the ultrasonic horn or other applicator in relation to the interface is dependent on the materials being joined, the geometries of the materials, and the performance criteria of the fused joint. In a preferred embodiment, the ultrasonic energy is applied by contacting the liquid polymeric material with the ultrasonic horn near the interface so that the ultrasonic energy is transmitted through the liquid polymer to the solid material at the interface. In this way, ultrasonic energy can be transferred to both the liquid polymeric material and the solid material simultaneously in the region of the interface. However, in other embodiments, the geometry of the solid part or other factors may require that the ultrasonic energy be applied through the solid part. The ultrasonic energy can be applied through a horn, or it can be applied by an actuator, such as piezoelectric elements, embedded in the mold, or by another means.

A joint is formed at the interface by allowing or causing the liquid polymeric material to solidify, to produce a solid article comprising the solidified polymeric material joined to the solid material. If the liquid polymeric material is a molten thermoplastic polymer, the polymer is solidified by allowing or causing it to cool. If the liquid polymer is an uncured or uncrosslinked thermoset oligomer or polymer mixture or alloy, the system is often solidified by initiating a polymerization reaction via heat, light or chemical means. Thus, ultrasonic energy could also be used to initiate a polymerization reaction during the molding process. A mold designed for ultrasonic injection molding as described could be adapted also to allow for a multitude of curing mechanisms, not limited to those mentioned above.

While not intending to be limited by theory, it is believed that several mechanisms may be at work in producing a dramatically stronger joint with the use of ultrasonic energy:

- the introduction of extra energy to heat and melt the solid polymer
- the introduction of extra energy to heat the molten polymer
- improved heat transfer between the molten polymer and the solid polymer
- better entangling of the polymer chains between the molten polymer and the solid polymer
- more intimate contact between the molten polymer and the solid polymer by removal of gasses or air bubbles from the interface
- better wetting of the solid polymer surface by the molten polymer The parameters of the ultrasonic energy will depend primarily on the size and composition of the liquid polymeric material and the solid material used to form the article. Any frequency suitable for ultrasonic welding should be applicable for the present invention. The broad range of about 10 to 100 kHz encompasses most applications, and the narrower frequency range of about 20 to 50 kHz is best suited for a large number of practical situations. A power level between about 1 and 1000 watts is appropriate for most any application. All but the largest articles can be joined with a power level between about 10 and 500 watts, with extremely small or delicate articles using less. The duration of the ultrasonic pulse should be appropriate for the size and material of the liquid polymeric material and the solid material, usually between about 0.5 second and about 60 seconds. The amplitude or power level of the ultrasonic energy may be modulated or adjusted during the joining process. The ultrasonic energy may be turned off and back on one or more times during the process.

Figure 3:
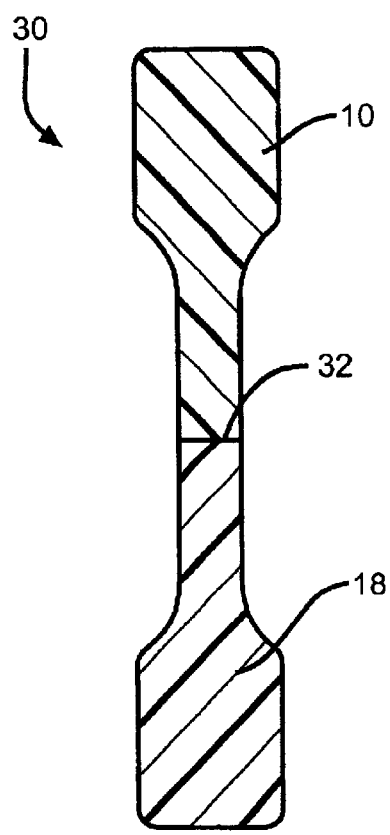
FIG. 3 is a cross-sectional view of an ultrasonically molded article produced in accordance with this invention.

FIG. 1 illustrates a preferred ultrasonic injection molding method in accordance with the invention. In the method, a solid polymer part 10 is positioned inside one-half of a cavity 12 of a mold 14. During injection, a piston assembly 16 applies pressure to a molten polymer 18, forcing the polymer through a nozzle 20 and into the other half of the mold cavity 12. The molten polymer 18 flows into contact with the solid polymer 10 at an interface 22 between the molten polymer and the solid polymer. An ultrasonic power supply (not shown) provides alternating current to a piezoelectric transducer contained in a converter 24. The piezoelectric transducer converts the current to ultrasonic energy in the form of high-frequency mechanical vibrations. The ultrasonic energy is transmitted through a booster 26 to an ultrasonic horn 28 positioned in contact with the molten polymer 18 near the interface 22. The horn 28 transmits the ultrasonic energy to the molten polymer 18 in the region of the interface. The molten polymer 18 then transfers a portion of the ultrasonic energy to the solid polymer 10 in the region of the interface, which causes melting of a portion of the solid polymer adjacent the interface. The parameters of the ultrasonic energy, the placement of the ultrasonic horn, the injection conditions, and the specific interface determine the area and degree of melting of the solid polymer. The polymers are allowed to cool until they both solidify, and the resulting solid article is removed from the mold. As shown in FIG. 3, the solid article 30 produced by the method comprises the solid polymer 10 strongly bonded to the solidified (previously molten) polymer 18 at a joint 32 formed at the interface.

Many different polymeric materials can be bonded by application of ultrasonic energy according to the invention. Resins which are amorphous (having no long range atomic order) are favorable since these often display a wide glass transition temperature range and due to the absence of crystalline regions, do not require excessive energy input. Semicrystalline polymers such as polyethylene, polypropylene and nylon can also be joined ultrasonically but require more energy to melt the crystalline phases. Dissimilar polymers can also be joined ultrasonically provided there is sufficient intermixing of polymer chains such that a favorable mechanical bond results. Other factors such as filler and moisture content, compatibilizing and release agents may also influence the quality of the resulting bond. The method of the invention is generally more useful for joining thermoplastic polymers than thermoset polymers.

The ultrasonic joining method of the invention provides many advantages over previously known joining methods. For example, the use of ultrasonic energy with injection molding allows the use of a lower melt temperature of the molten polymer compared to a method without ultrasonic energy. By way of background, if the molten polymer is sufficiently heated above the melting temperature of the solid polymer, it will melt the surface of the solid polymer on contact and form a bond. However, there are circumstances where heating the molten polymer to a very high temperature is disadvantageous or impractical. For instance, energy requirements for certain processes require high efficiency. Furthermore, a common limiting factor in polymer processing is the tendency for polymeric materials to degrade at elevated temperatures. A high temperature of the mold itself can soften the solid polymer, but it softens the entire polymer and not just the surface to be bonded, and the final result is often inadequate. Operators often limit the melt temperature of the material to be injected to just above what is necessary for melting and flow. However, this can result in molded articles having poor joint strength between the bonded polymers. The method of the present invention achieves improved joint strength at lower melt temperatures. In fact, articles made at lower temperatures by the method of the invention have better joint integrity than articles made by conventional methods at high temperatures. In one embodiment, the thermoplastic polymer is melted at a temperature not greater than 20° F. (11° C.) above its melting point, and the application of ultrasonic energy provides a stronger joint than a joint formed by the same method without the application of ultrasonic energy in which the thermoplastic polymer is melted at a temperature greater than 20° F. (11° C.) above its melting point.

Another advantage of the ultrasonic joining method of the invention is that residence time in the injection molder and/or mold is minimized since the ultrasonic energy can be applied locally, minimizing the time necessary for mixing in the injection molder screw. Since the ultrasonic energy can be applied in a localized manner, recycled or reground polymer material can also be incorporated as filler in high concentrations where acted upon by ultrasonics. Accordingly, lower cost polymers may be more effectively utilized since processing performance can be greatly enhanced with the use of ultrasonics.

The ultrasonic injection molding method of the invention is superior to conventional injection molding since the final article is a composite of two molding processes. Shapes that would have been difficult or impossible to achieve in a single injection molding operation are now possible. In addition, two or more different polymers can be incorporated in a single article.

An additional benefit of articles joined in this way is the controlled strength of the joint. Whereas in most applications, the ultrasonic energy would be optimized to provide the highest possible strength, there may be other applications where a particular fracture location or breaking strength may be desirable. By purposely but carefully de-optimizing the ultrasonic energy, joints with any desired strength, up to the maximum achievable, can be designed. In one embodiment, the application of the ultrasonic energy is controlled to form a breakable joint having a yield stress between about 100 psi (7 kg/cm$^2$) and about 4000 psi (280 kg/cm$^2$).

In another embodiment, the present invention relates to a method of joining a first solidifiable liquid polymeric material to a second solidifiable liquid polymeric material to produce a solid article. As described above, the solidifiable liquid polymeric materials are usually molten thermoplastic polymers, but they can also be thermoset polymers or other reactive oligomers or polymers before curing. More than two liquid polymeric materials can also be simultaneously joined by the method. The first liquid polymeric material and the second liquid polymeric material are materials of differing composition.

The first liquid polymeric material is contacted with the second liquid polymeric material at an interface between the first polymeric material and the second polymeric material. Any method suitable for producing the desired article can be used for contacting the first liquid polymeric material with the second liquid polymeric material. In a preferred method, the first liquid polymeric material and the second liquid polymeric material are introduced into a mold so that they flow against each other. Preferably, the method is an injection molding process in which both the first liquid polymeric material and the second liquid polymeric material are injected into a mold, and a flow front of the first liquid polymeric material flows against a flow front of the second liquid polymeric material. Other types of molding can also be used, such as blow molding.

As discussed above, U.K. Patent Application GB 2,306, 378-A discloses the use of ultrasonic energy in an injection molding process to mitigate against the formation of weld lines when two flow fronts of the same polymer converge. The method of the present invention is significantly different from the disclosed method, because the present method is concerned with improving the joint integrity between different types of polymeric materials, not with mitigating against the formation of weld lines in a single type of polymer. The joining of different types of polymeric materials is much more difficult than the joining of two portions of a single polymer. The U.K. application discloses nothing about joining different polymeric materials.

In another preferred method of contacting the first liquid polymeric material with the second liquid polymeric material, the first and second polymeric materials are co-extruded so that the extruded polymeric materials contact each other.

When contacting the first liquid polymeric material with the second liquid polymeric material, the flow of the first and second polymeric materials may be parallel, as in an extrusion process or a blow molding process, or the flow may be opposing as in an injection molding process with the polymeric materials entering through two or more nozzles.

During the contacting of the first polymeric material and the second polymeric material, ultrasonic energy is applied so that the energy reaches the interface between the first polymeric material and the second polymeric material. The parameters of the ultrasonic energy are as described above. The application of the ultrasonic energy improves the integrity of the joint compared to the same method without the application of ultrasonic energy.

A joint is formed at the interface by allowing or causing the first liquid polymeric material and the second liquid polymeric material to solidify, to produce a solid article comprising the solidified first polymeric material joined to the solidified second polymeric material.

Figure 2:
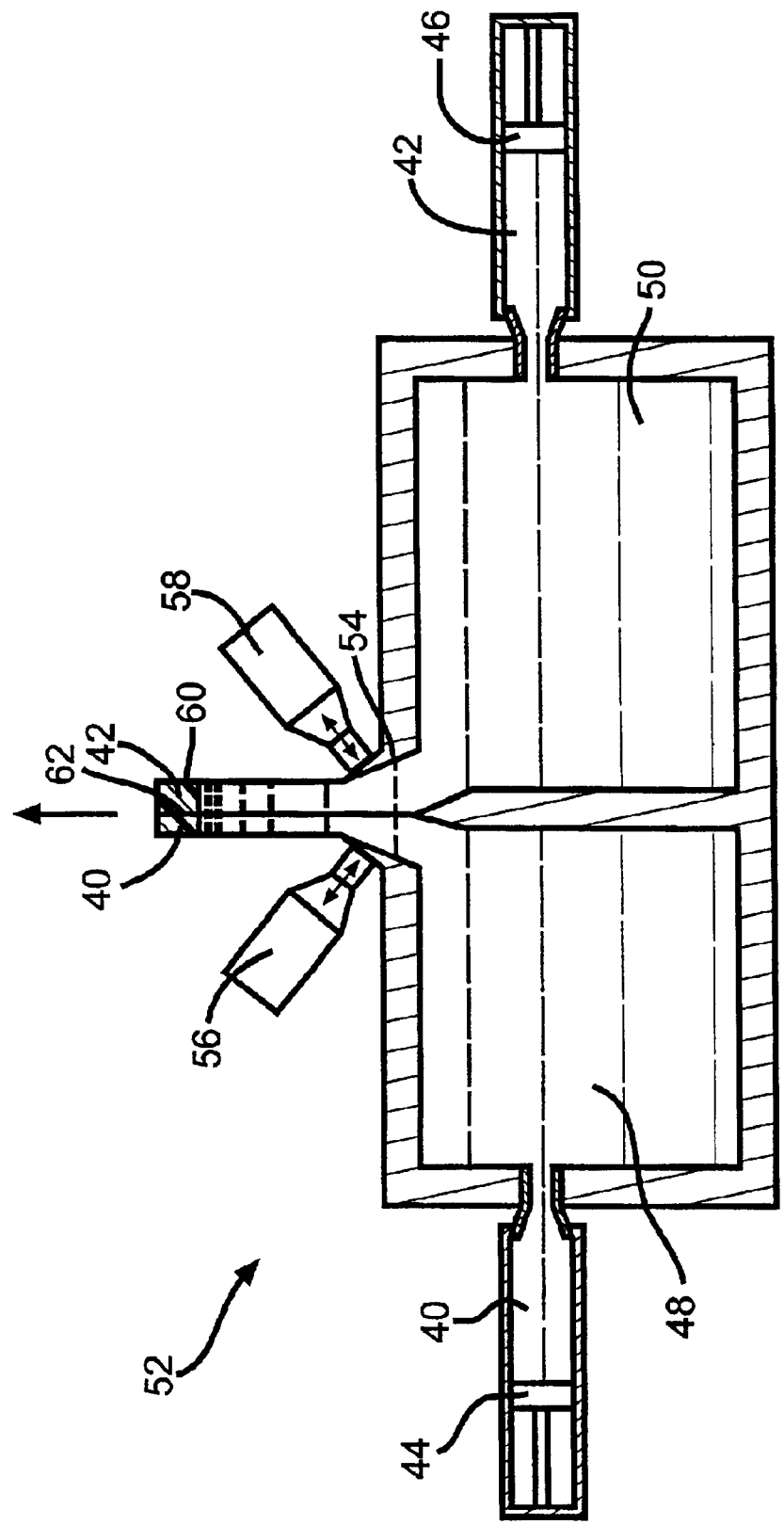
FIG. 2 is a schematic representation of an ultrasonic co-extrusion method in accordance with this invention.

FIG. 2 illustrates a preferred ultrasonic co-extrusion method in accordance with the invention. In the method, a first liquid polymer 40 and a second liquid polymer 42 are forced continuously by pistons 44 and 46 into first and second chambers 48 and 50, respectively, of an extrusion apparatus 52. The continuous flow of the first and second liquid polymers 40 and 42 into the chambers 48 and 50 forces the polymers through an extrusion nozzle 54 into contact with each other. First and second ultrasonic transducers 56 and 58 apply ultrasonic energy to the polymers as they are extruded. The polymers solidify and exit the extrusion nozzle, forming a solid article 60. The article 60 comprises the first polymer 40 bonded to the second polymer 42 at a joint 62 having good integrity.

In other embodiments, the present invention relates more generally to applying ultrasonic energy during the molding or extrusion of first and second materials, where the first material differs in composition from the second material. The application of ultrasonic energy improves the integrity of the joint between the first and second materials in the resulting solid article. The different materials could be different polymers, or other different materials such as different cellulose-based materials, natural fibers, inorganics or metals.

There are many applications for joining different materials. For example, in weather stripping it would be advantageous to have a soft, conformable layer on top of a stiffer strength member. Similarly for decorative trim, a visually appealing layer might be extruded with a strong but low-cost material. In yet other applications, the two different materials may be mixed so thoroughly that they form a uniform blend with properties unlike any of the component materials. Still another benefit of the enhanced mixing at the interface of two materials joined in a molding process is that, when the two parts are of different color, the mixing pattern can be made to produce a pattern that is decorative and attractive. Other expected advantages include improved flow through or into small channels, and a reduction in the number of steps required in the manufacture of the articles.

In a molding process according to the invention, at least one of the first and second materials is a solidifiable liquid material. The method involves inserting the first material and the second material into a mold, and contacting the first material with the second material at an interface. In a preferred embodiment, the first material is a solidifiable liquid material and the second material is a solid material, and the solid material is positioned inside the mold before the liquid material is introduced. In such a process, the contacting step involves introducing the liquid material into the mold so that the liquid material flows against the solid material. Ultrasonic energy is applied so that the energy reaches the interface between the contacting first material and second material. In a preferred embodiment, the ultrasonic energy is applied by contacting the liquid material with an ultrasonic horn near the interface so that the ultrasonic energy is transmitted through the liquid material to the solid material at the interface. A joint is formed at the interface by allowing or causing the liquid material to solidify, to produce a solid article comprising the solid first material joined to the solid second material. The application of the ultrasonic energy improves the integrity of the joint compared to the same method without the application of ultrasonic energy.

In an extrusion process according to the invention, the method involves extruding a first solidifiable liquid material and a second solidifiable liquid material, thereby contacting the first material with the second material at an interface. In one embodiment, the first material and the second material are extruded so that the first material forms a layer over the second material. Ultrasonic energy is applied so that the energy reaches the interface between the contacting first material and second material. A joint is formed at the interface by allowing or causing the first material and the second material to solidify, to produce a solid article comprising the solid first material joined to the solid second material. The application of the ultrasonic energy improves the integrity of the joint compared to the same method without the application of ultrasonic energy.

In another extrusion process according to the present invention, at least one solidifiable liquid material is extruded and joined to an existing solid part. A joint is formed along the interface of the materials by allowing or causing the solidifiable material or materials to solidify, to produce a solid article comprising the solidifiable material or materials joined to the original solid part. During the contacting of the liquid material and the solid part, ultrasonic energy is applied so that the energy reaches the interface. The application of the ultrasonic energy improves the integrity of the joint compared to the same method without the application of ultrasonic energy.

In another embodiment, the invention relates to a method of joining a solidifiable liquid polymeric material to a reinforcement material or to a filler to produce a composite material. The reinforcement material may comprise reinforcement fibers, spheroidal particulates, nano-scale materials, or other strengthening or reinforcement materials known in the art. The composite materials may also be formulated with fillers, such as natural fibers, which may be preferentially exfoliated with ultrasonic energy and serve as reinforcement fillers at or near an interface. In a similar manner, nano-fibers or nano-particulates may be incorporated into polymeric resins to form composite materials with superior physical and mechanical properties. The advantage of this particular type of filler is the high surface to volume ratio allowing for tailorable interfacial properties. Some examples of others of the many types of fillers that can be used include carbon black, silica, aluminum oxide, titanium oxide, zinc stearate, and other metallic particles. Mixtures of different fillers can also be added. The filler(s) can be added for many kinds of benefits, such as to improve mechanical properties, affect conductivity, improve flowability, or other benefits.

The method of producing a composite material involves contacting the reinforcement material and/or the filler with the liquid polymeric material at an interface. In one embodiment, the contacting step involves forming a layer of the liquid polymeric material over the reinforcement material. A joint is formed at the interface by allowing or causing the polymeric material to solidify, to produce a composite material comprising the solidified polymeric material joined to the reinforcement material and/or to the filler. During the contacting of the polymeric material, ultrasonic energy is applied so that the energy reaches the interface between the reinforcement material and/or the filler and the polymeric material. The application of the ultrasonic energy improves the integrity of the joint compared to the same method without the application of ultrasonic energy.

In one embodiment, the method of producing a composite material is part of a pultrusion process in which the polymeric material is formed over the reinforcement material. The contacting step involves coating a substantially continuous length of the reinforcement material with the solidifiable liquid polymeric material. After the contacting step, the continuous polymeric material-coated reinforcement material is drawn through a die to set the desired cross-sectional shape of the composite material, before solidifying the polymeric material.

Often in polymer molding and joining processes, materials must be chemically compatible in order to properly join. Incompatible materials cannot be joined by heat alone. Either they will not join or the resulting joint will have poor integrity. It is the chemical compatibility of polymer chains that allows them to entangle and impart mechanical integrity to the solid article. In another embodiment of this invention, a compatibilizing material is used along with ultrasonic energy to join two materials together. For instance, two materials which are not chemically compatible, such as polar Nylon and less polar polyethylene, may be joined by employing a compatibilizing material at the interface which possesses chemical properties intermediate of the two being joined.

In this embodiment, a first material is joined to a second material to produce a solid article. At least one of the first and second materials is a solidifiable liquid material. Also provided is a solid or liquid compatibilizing material. The first material and the second material are contacted with the compatibilizing material, to form at least one interface between at least two of the compatibilizing material, the first material and the second material. In some embodiments, the compatibilizing material is positioned between the first material and the second material, the first material and the compatibilizing material are contacted at a first interface, and the second material and the compatibilizing material are contacted at a second interface. Ultrasonic energy is applied so that the energy reaches the at least one interface. In some embodiments, the ultrasonic energy is applied so that it reaches both the first and second interfaces. At least one joint is formed at the at least one interface by allowing or causing the first material and/or the second material to solidify in contact with the solid compatibilizing material, or by allowing or causing the first and/or second materials and the liquid compatibilizing material to solidify. It may be a single joint, a gradient of materials, or possibly two separate joints. A solid article is produced comprising the first material, the second material and the compatibilizing material joined together. The application of the ultrasonic energy improves the integrity of the joint(s) compared to the same method without the application of ultrasonic energy.

The use of the thin layer of compatibilizing material combined with application of ultrasonic energy yields a much stronger bond between otherwise incompatible materials than can be achieved with either the compatibilizing material or the ultrasonics alone. Thus, the intermediate step in prior art of compounding compatibilizing agents into a resin may be eliminated. Many different compatibilizing materials can be used. One of many possible examples of a compatibilizing material is Primacore®, a copolymer of ethylene and acrylic acid commercially available from Dow Chemical Co., Midland, Mich. The non-polar polyethylene units are compatible with polyethylene while the poly (acrylic acid) units are compatible with Nylon. Different types of Primacore can be used, for example Primacor 5980, Primacor 3330 and Primacor 3440. Some other examples of compatibilizing materials are Iotek 7030 (Exxon), Surlyn 9910 (Dupont), Saranex 23-P (Dow), and other ethylene methyl acrylate and ethylene butyl acrylate grades (e.g., from Chevron). Blends of compatibilizing materials can also be used. In cases where two materials are incompatible, it is often because the molecules of the respective materials have widely different polarity. The compatibilizing material in these cases would ordinarily be a material with a polarity intermediate of the two materials, as exemplified above. However, for the purposes of this invention, the compatibilizing material can be any material that promotes the bonding of the two materials, including any third phase that forms a bridge between the two materials. By placing a small amount of such a compatibilizing material at the interface and applying ultrasonic energy during the molding process, a favorable bond may be produced in the final article. This ability to economically join what were previously considered to be incompatible materials will enable cost reductions in a number of polymer parts.

EXAMPLE 1

A single-piece article having a shape like shown in FIG. 3 was injection molded from Novapol® (polyethylene from Nova Chemicals, Corp., Calgary, Canada). The article was then cut in two along a beveled surface near its center. One-half of the article was put back into the mold as a solid piece, and the other half of the mold was filled with molten polyethylene by injection molding. During the injection cycle of the molten polyethylene, ultrasonic energy was applied so that it reached the interface between the molten polyethylene and the solid piece, using a 40-kHz transducer and an aluminum horn whose tip of circular cross section was flush with the mold cavity. The resulting joint, due to the application of ultrasonic energy during the molding process, was of superior integrity compared to the joint of an article made without the use of ultrasonic energy. Visual observations of the joint indicated a good bond. Furthermore, mechanical testing indicated a cohesive failure mode.

EXAMPLE 2

Figure 4:
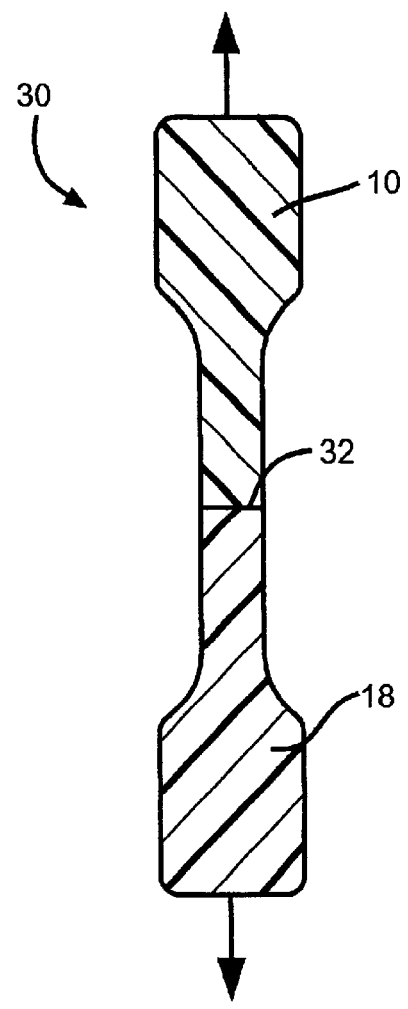
FIG. 4 is an illustration of the test configuration used with the article of FIG. 3 to determine the strength of its joint.
Figure 5:
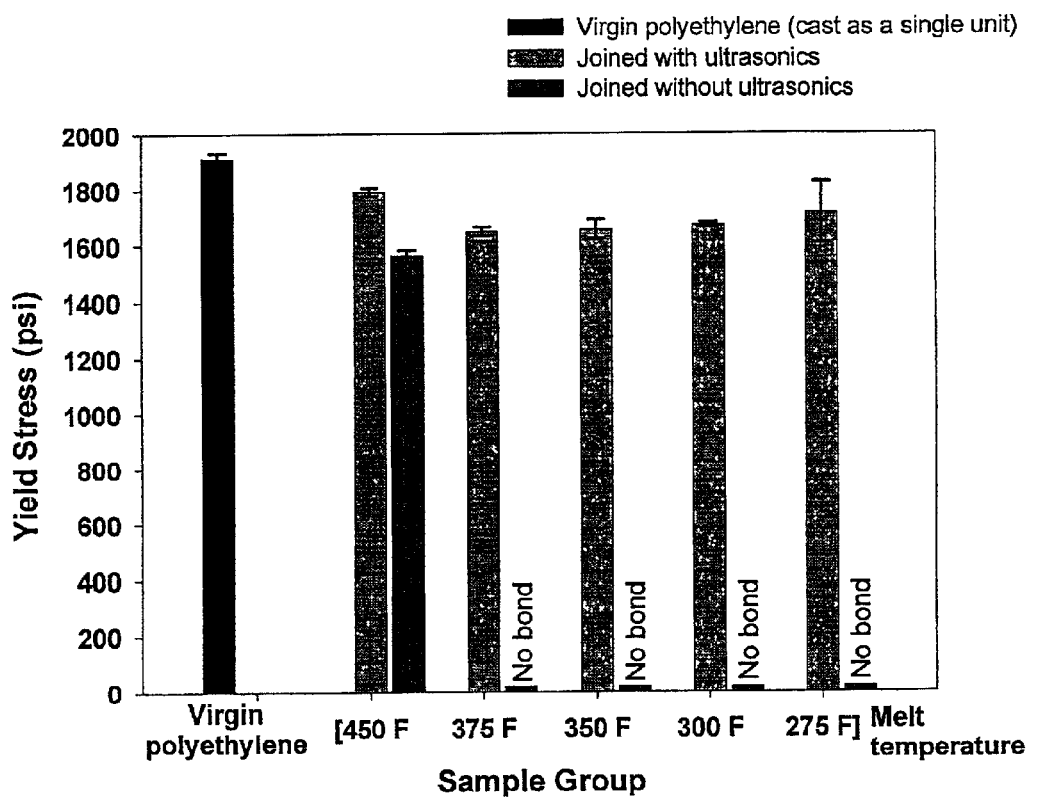
FIG. 5 is a bar graph of data showing the joint strength of ultrasonically molded articles produced at different temperatures in accordance with this invention, compared to the strength of articles molded as a single piece and to the strength of articles molded without ultrasonic energy.

Several articles were produced as described in Example 1, by placing one-half of the article into the mold as a solid piece and filling the other half of the mold with molten polyethylene, while applying ultrasonic energy to the joint. The molten polyethylene was injected into the mold at different melt temperatures between 275° F. (135° C.) and 450° F. (232° C.). The yield strengths of the articles produced were measured in a tensile test machine, with the articles being pulled longitudinally in each direction as shown in FIG. 4. The measured yield strengths of the articles are shown in the bar graph of FIG. 5. The leftmost bar in the graph shows the average yield strength of articles made of virgin polyethylene, molded and tested as a single piece. The light gray bars labeled "Joined with ultrasonics" show that the articles made at different melt temperatures in accordance with the invention had excellent yield strengths, similar to those of single-piece articles made of virgin polyethylene. The one dark bar labeled "Joined without ultrasonics" shows the average yield strength of articles made with a melt temperature of 450° F. (232° C.), following an identical procedure as the other articles but without ultrasonic energy. The yield strength was significantly lower than the articles made according to the invention. When articles were made without ultrasonic energy at a melt temperature at or below 375° F.(191° C.), the yield strength was zero; the articles fell apart when they were removed from the mold.

The ultrasonic joining methods of the invention will have use in many fields, such as automotive, medical, aerospace, packaging, consumer products and electronics.

A prominent example of the embodiment using a compatibilizing material would be parts where only the surface is visible to consumers, as in the case of push buttons. A relatively thin layer of a material having soft feel and pleasing appearance (e.g., Santoprene®, an ethylene propylene diene monomer (EPDM) and polypropylene from Advanced Elastomer Systems, Akron, Ohio), can be securely bonded to a base of much less expensive material such as recycled polyethylene. Alternatively, the application of ultrasonic energy during the method allows the use of less compatibilizing agent than would otherwise have been used without the application of the ultrasonic energy.

The principle and mode of operation of this invention have been described in its preferred embodiments. However, it should be noted that this invention may be practiced otherwise than as specifically illustrated and described without departing from its scope. For example, the invention has been illustrated with examples of and references to specific kinds of molding, including injection molding and extrusion. Persons skilled in the production of polymeric parts are familiar with a variety of forming processes and will be readily able to apply the teachings of this patent to other processes beyond those illustrated here. Such applications would fall within the scope of one or more of the claims set forth below. Although different advantages of the invention have been described, it should be recognized that the claimed invention is not limited to the achievement of any particular advantages.

What is claimed is:

1. A method of joining a solidifiable liquid polymeric material to a solid material to produce a solid article, the method comprising the steps of:

contacting a solid material with a solidifiable liquid polymeric material at an interface between the solid material and the liquid polymeric material;

applying ultrasonic energy so that the energy reaches the interface between the contacting solid material and liquid polymeric material; and forming a joint at the interface by allowing or causing the liquid polymeric material to solidify, to produce a solid article comprising the solidified polymeric material joined to the solid material.

2. A method according to claim 1 comprising an additional step of positioning the solid material inside a mold before the contacting step, wherein the contacting step comprises introducing the liquid polymeric material into the mold so that the liquid polymeric material contacts the solid material.

3. A method according to claim 1 wherein the ultrasonic energy is applied by contacting the liquid polymeric material with an ultrasonic horn near the interface so that the ultrasonic energy is transmitted through the liquid polymeric material to the solid material at the interface.

4. A method according to claim 1 wherein the solidifiable liquid polymeric material comprises a solidifiable liquid polymer.

5. A method according to claim 1 wherein the solid material comprises a solid polymer.

6. A method according to claim 1 wherein the solidifiable liquid polymeric material comprises a molten thermoplastic polymer, wherein the step of solidifying the molten polymer comprises allowing or causing the molten polymer to cool until solid, and the method comprising an additional step before the contacting step of melting the thermoplastic polymer at a temperature not greater than 20° F. (11° C.) above the melting point of the thermoplastic polymer, wherein the application of the ultrasonic energy provides a joint having greater integrity than a joint formed by the same method without the application of ultrasonic energy in which the thermoplastic polymer is melted at a temperature greater than 20° F. (11° C.) above the melting point.

7. A method according to claim 1 wherein the method is part of a process selected from the group consisting of potting, laminating, coating, painting, filling, spraying, and applying.

8. A method according to claim 1 wherein the ultrasonic energy is applied at a frequency between about 10 kHz and about 100 kHz, at a power level between about 1 watt and about 1000 watts, and for a duration between about 0.5 second and about 60 seconds.

9. A method according to claim 1 wherein the application of the ultrasonic energy is controlled to form a breakable joint having a yield stress between about 100 psi and about 4000 psi.

10. A method according to claim 1 wherein the contacting step comprises forming a layer of the liquid polymeric material over the solid material.

11. A method of joining a first solidifiable liquid polymeric material to a second solidifiable liquid polymeric material to produce a solid article, the method comprising the steps of:

contacting the first liquid polymeric material with the second liquid polymeric material at an interface between the first polymeric material and the second polymeric material, where the first polymeric material and the second polymeric material are materials of differing composition;

applying ultrasonic energy so that the energy reaches the interface between the contacting first polymeric material and second polymeric material; and forming a joint at the interface by allowing or causing the first polymeric material and the second polymeric material to solidify, to produce a solid article comprising the solidified first polymeric material joined to the solidified second polymeric material.

12. A method according to claim 11 wherein the contacting step comprises introducing the first liquid polymeric material and the second liquid polymeric material into a mold so that the first liquid polymeric material and the second liquid polymeric material flow against each other.

13. A method according to claim 11 wherein the contacting step comprises extruding the first liquid polymeric material and the second liquid polymeric material so that the extruded polymeric materials contact each other.

14. A method of joining a first material to a second material in a molding process to produce a solid article, the method comprising the steps of:

introducing a first material and a second material into a mold, thereby contacting the first material with the second material at an interface between the first material and the second material, where the first material and the second material are materials of differing composition, and where at least one of the first material and the second material is a solidifiable liquid material;

applying ultrasonic energy so that the energy reaches the interface between the contacting first material and second material; and forming a joint at the interface by allowing or causing the at least one solidifiable liquid material to solidify, to produce a solid article comprising the solid first material joined to the solid second material.

15. A method according to claim 14 wherein the first material is a solidifiable liquid material and the second material is a solid material, wherein the solid material is positioned inside the mold before the liquid material is introduced, and wherein the contacting step comprises injecting the liquid material into the mold so that the liquid material flows against the solid material.

16. A method according to claim 15 wherein the ultrasonic energy is applied by contacting the liquid material with an ultrasonic horn near the interface so that the ultrasonic energy is transmitted through the liquid material to the solid material at the interface.

17. A method of joining a first material to a second material in an extrusion process to produce a solid article, the method comprising the steps of:

extruding a first solidifiable liquid material and a second solidifiable liquid material, thereby contacting the first material with the second material at an interface between the first material and the second material, where the first material and the second material are materials of differing composition;

applying ultrasonic energy so that the energy reaches the interface between the contacting first material and second material; and forming a joint at the interface by allowing or causing the first material and the second material to solidify, to produce a solid article comprising the solid first material joined to the solid second material.

18. A method according to claim 17 wherein the first and second materials comprise first and second molten thermoplastic polymers, and wherein the step of solidifying the molten polymers comprises allowing or causing the molten polymers to cool until solid.

19. A method according to claim 17 wherein the first material and the second material are extruded so that the first material forms a layer over the second material.

20. A method of joining a solidifiable liquid polymeric material to a reinforcement material or a filler, the method comprising the steps of:

contacting a reinforcement material or a filler with a solidifiable liquid polymeric material at an interface between the reinforcement material or the filler and the polymeric material;

applying ultrasonic energy so that the energy reaches the interface between the contacting reinforcement material or filler and the liquid polymeric material; and forming a joint at the interface by allowing or causing the polymeric material to solidify, to produce a material comprising the solidified polymeric material joined to the reinforcement material or the filler.

21. A method according to claim 20 comprising a pultrusion process in which the contacting step comprises coating a substantially continuous length of the reinforcement material with the solidifiable liquid polymeric material, and comprising an additional step after the contacting step of drawing the continuous polymeric material-coated reinforcement material through a die to set the desired cross-sectional shape of the resulting composite material, before solidifying the polymeric material.

22. A method according to claim 20 wherein the contacting step comprises forming a layer of the liquid polymeric material over the reinforcement material.

23. A method of joining a first material to a second material to produce a solid article, the method comprising the steps of:

providing a first material and a second material, where at least one of the first and second materials is a solidifiable liquid material;

providing a solid compatibilizing material or a solidifiable liquid compatibilizing material;

contacting the first material and the second material with the compatibilizing material, to form at least one interface between at least two of the compatibilizing material, the first material and the second material;

applying ultrasonic energy so that the energy reaches the at least one interface; and forming at least one joint at the at least one interface by allowing or causing the at least one solidifiable liquid material to solidify in contact with the solid compatibilizing material, or by allowing or causing the at least one solidifiable liquid material and the solidifiable liquid compatibilizing material to solidify, to produce a solid article comprising the first material, the second material and the compatibilizing material joined together.

24. A method according to claim 23 wherein the compatibilizing material has chemical properties intermediate of the first and second materials.

25. A method according to claim 23 wherein the compatibilizing material is a copolymer.

26. A method according to claim 23 wherein the first material is more polar than the second material.

27. A method according to claim 26 wherein the first material is Nylon and the second material is polyethylene.

28. A method according to claim 27 wherein the compatibilizing material is a copolymer of ethylene and acrylic acid.

29. A method according to claim 23 wherein the solid article comprises a base of the first material and a relatively thin layer of the second material joined to a surface of the base.

30. A method of joining a solidifiable liquid material to a solid part in an extrusion process to produce a solid article, the method comprising the steps of:

extruding a solidifiable liquid material so that the liquid material contacts a solid part at an interface;

applying ultrasonic energy so that the energy reaches the interface between the contacting liquid material and solid part; and forming a joint at the interface by allowing or causing the liquid material to solidify, to produce a solid article comprising the solidified liquid material joined to the solid part.

* * * * *